United States Patent [19]
Satou

[11] Patent Number: 5,138,565
[45] Date of Patent: Aug. 11, 1992

[54] SHIELDED ELECTRONIC APPARATUS HAVING A REMOVABLE SHIELDED DISPLAY

[75] Inventor: Youji Satou, Tokyo, Japan

[73] Assignee: Kabushiki Kaisha Toshiba, Kawasaki, Japan

[21] Appl. No.: 576,650

[22] Filed: Sep. 5, 1990

[30] Foreign Application Priority Data

Oct. 31, 1989 [JP] Japan ................................ 1-283725

[51] Int. Cl.⁵ .......................... G06F 1/00; H05K 9/00
[52] U.S. Cl. ..................................... 364/708; 361/424
[58] Field of Search ................. 364/708, 200 MS File, 364/900 MS File; 248/900, 917, 919, 922, 923; 174/35 R; 439/31; 361/424

[56] References Cited

U.S. PATENT DOCUMENTS

| | | | |
|---|---|---|---|
| 4,744,006 | 5/1988 | Duffield | 361/424 |
| 4,749,364 | 6/1988 | Arney et al. | 439/372 |
| 4,884,171 | 11/1989 | Maserang et al. | 361/424 |
| 4,926,365 | 5/1990 | Hsieh | 364/708 |

FOREIGN PATENT DOCUMENTS 0269126  6/1988  European Pat. Off. .
1482707  8/1977  United Kingdom .

OTHER PUBLICATIONS

"Removable Liquid Crystal Display for a Personal Computer" IBM Technical Disclosure Bulletin, vol. 29, No. 10, Mar. 1987 pp. 4273-4274.

Eaton et al., "Design of HP's Portable Computer Family," Hewlett-Packard Journal, Jul. 1986, pp. 4-13.

*Primary Examiner*—Long T. Nguyen
*Attorney, Agent, or Firm*—Finnegan, Henderson, Farabow, Garrett and Dunner

[57] ABSTRACT

A portable computer includes a main body and a removable display unit. The main body has a receiving member rotatably supported on the main body by a hinge shaft which is fixed to the main body and electrically connected to a shielding layer of the main body for electromagnetically shielding the main body. A conductive layer is formed on the receiving member and electrically connected to the hinge shaft by an elastic conducting piece. The display unit has a connecting portion removably fitted to the receiving member. The connecting portion has a conductive portion electrically connected to a shielding layer of the display unit for electromagnetically shielding the display unit. An elastic contact piece is fixed to the conductive portion of the receiving member, and a contact portion is formed on the conductive portion of the connecting portion and elastically contact the contact piece to electrically connect the conductive portions to each other.

12 Claims, 5 Drawing Sheets

SHIELDED ELECTRONIC APPARATUS HAVING A REMOVABLE SHIELDED DISPLAY

BACKGROUND OF THE INVENTION

1. Field of the Invention

The present invention relates to a portable electronic apparatus such as a portable lap-top type personal computer and a portable word processor.

2. Description of the Related Art

A portable electronic apparatus, such as a lap-top type personal computer, generally comprises a keyboard mounted on the upper front portion of a main body and a flat display unit pivotally connected between the keyboard and the rear portion of the main body. When the display unit is closed, the keyboard is covered with the display unit. There has recently been developed a lap-top computer in which the display unit is removable from the main body, as shown in the U.S. Pat. No. 4,749,364.

In general, a personal computer has a main circuit board housed in the main body and a shielding portion, such as a shielding layer formed on the inner surface of the main body, for shielding noise generated by the main circuit board and external noise producing an adverse effect on the main circuit board. Since the display unit houses a drive circuit therein, it is preferred that the display unit like the main body be shielded from noise.

In a computer having a removable display unit, if, however, the shielding layer is formed on the display unit, the structure, for removably mounting the display unit on the main body, hinders the shielding layer from being electrically connected to the ground circuit in the main body. With the most conventional lap-top type personal computers each having a removable display unit, therefore, the display units are not grounded, exhibiting a poor shielding characteristic.

SUMMARY OF THE INVENTION

Accordingly, the object of the present invention is to provide a portable electronic apparatus in which the removable display unit can be fully shielded by a simple construction.

In order to attain this object, a portable electronic apparatus of the present invention comprises a main body provided with a shielding portion for electromagnetically shielding the interior of the main body, and a hinge shaft attached to the main body and electrically connected to the shielding portion. A receiving member is supported by the hinge shaft so as to be rotatable with respect to the main body. The receiving member has an externally opened mounting portion, and an electrically conductive portion provided in the inner face of the mounting portion. A display unit has a connecting portion removably fitted in the mounting portion of the receiving member and is rotatable together with the receiving member. The display unit further has a shielding portion for electromagnetically shielding the interior of the display unit. The connecting portion has an electrically conductive portion electrically connected to the shielding portion of the display unit. The electronic apparatus of the present invention further comprises first conducting means for electrically conducting the conductive portion of the receiving member with the conductive portion of the connecting portion, when the connecting portion is fitted in the mounting portion of the receiving member, and second conducting means provided between the conductive portion of the receiving member and the hinge shaft, for effecting electrical connection therebetween.

With the electronic apparatus of the present invention having the above-mentioned construction, when the display unit is mounted on the main body by inserting the connecting portion in the mounting portion of the receiving member, the connecting portion, which is electrically connected to the shielding portion of the display unit, can be electrically connected to the shielding portion of the main body through the first conducting means, the conductive portion of the connecting portion, the second conducting means, and the hinge shaft.

This structure allows the shielding portions of both the display unit and the main body to be properly grounded and permits the display unit and the main body to be fully shielded The grounding operation of the shielding portion of the display unit is carried out in a simple way because it uses the same mounting operation of the display unit on the main body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 to 7 show a lap-top type portable computer according to an embodiment of the present invention, in which:

DETAILED DESCRIPTION OF THE PREFERRED EMBODIMENTS

The present invention will now be explained by way of an embodiment with reference to FIGS. 1 to 7.

Figure 1:
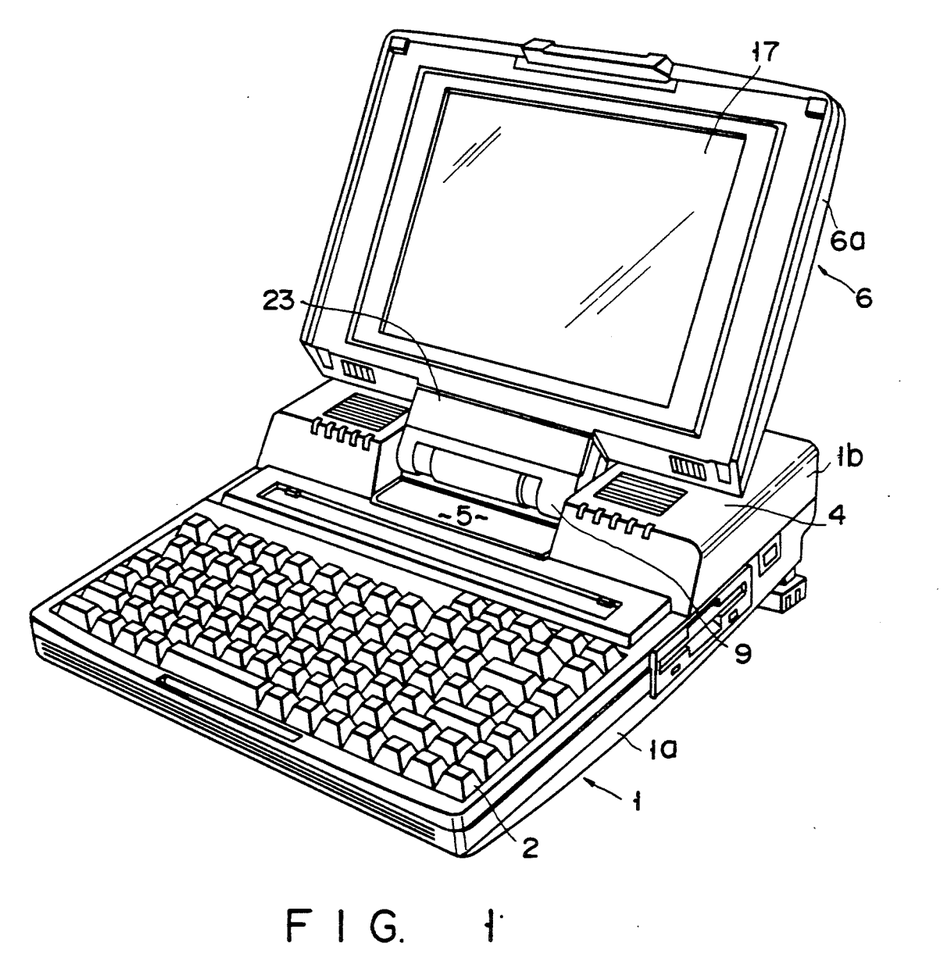
FIG. 1 is a perspective view of the whole computer in a state wherein a display unit is fitted to a main body of the computer.
Figure 2:
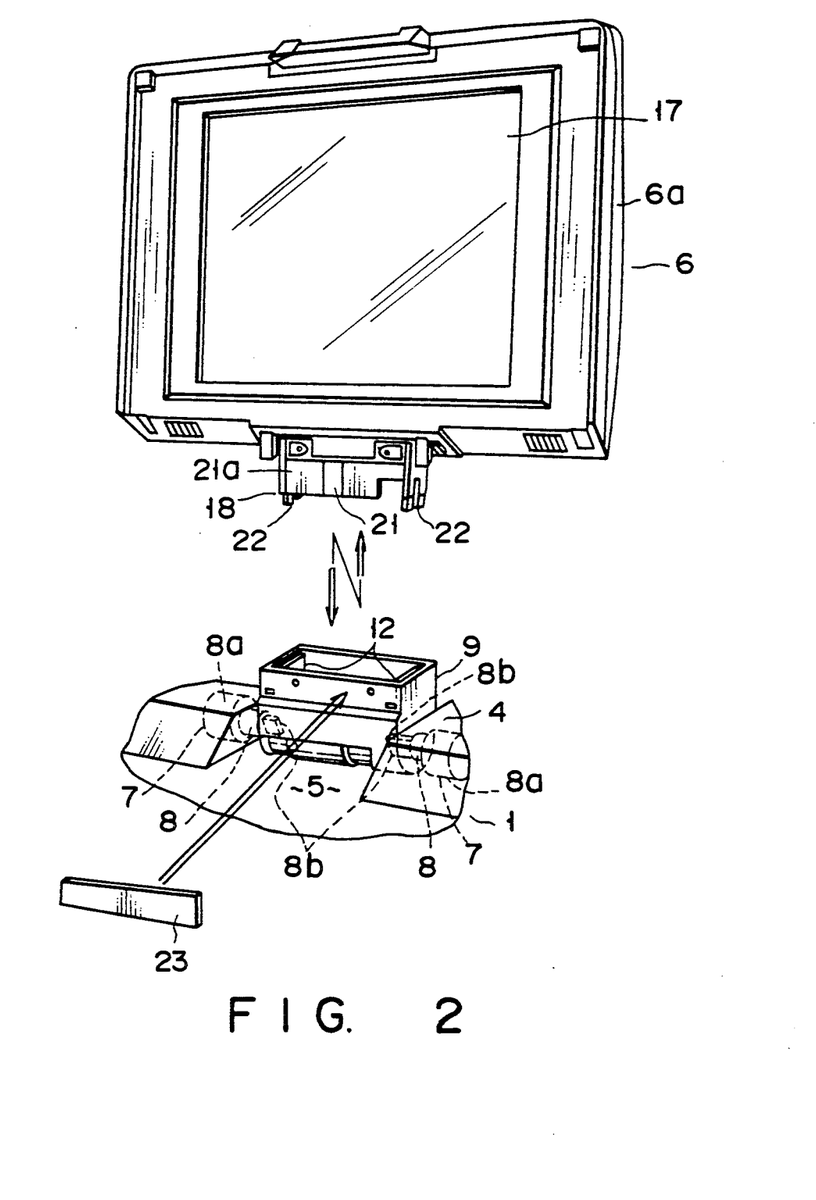
FIG. 2 is a perspective view of the computer in a state wherein the display unit is removed.
Figure 3:
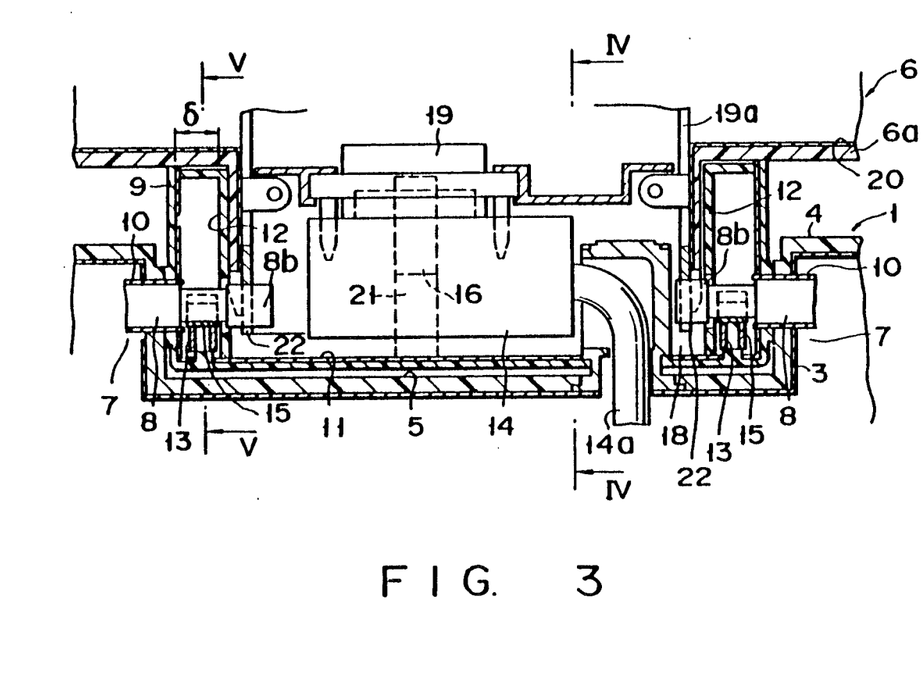
FIG. 3 is a cross-sectional view of the conducting structure of the shielding portions, in a state wherein the display unit is fitted to the main body.

As shown in FIGS. 1 to 3, a lap-top type portable computer to which the present invention is applied has a flat box shaped main body 1 which has a thin front portion 1a and a thick rear portion 1b. A keyboard 2 is provided on the front portion 1a of the main body 1. On the inner face (over the whole area of the inner face, for example) of the main body 1 is formed a plated layer 3 (see FIG. 3) acting as an electrically conductive layer which is electrically connected to the ground circuit of a main circuit board, not shown. The plated layer 3 constitutes a shielding portion of the main body 1 for shielding the interior of the main body from electromagnetic waves.

In the front central part of the upper portion 4 of the rear portion 1b is formed a recess 5 opened upward and forward. A flat display unit 6 is mounted in the recess 5 so as to be swingable back and forth and so as to be removable from the main body 1. The mounting structure of the display unit 6 on the main body 1 is shown in FIGS. 2 to 7.

Specifically, adjacent to the lateral walls defining the recess 5 in the rear portion 1b are provided a pair of hinges such as hinge devices 7 which are generally so called as a shaft rocking device. Each hinge device 7 has a cylinder 8a acting as a mounted portion, a hinge shaft 8 approximately half portion of which is rotatably inserted in the cylinder 8a and acts as a supporting portion, and a densely wound coil spring (not shown) for interconnecting the cylinder 8a with the hinge shaft 8. The hinge device 7 is fixed by screws to the inner surface of the upper portion 4 so that the distal end portion of the hinge shaft 8 projects into the recess 5 passing through the lateral wall of the main body 1, which defines the recess. Each component of the hinge device 7 is made of an electrically conductive metal and the overall hinge device 7 is electrically connected to the plated layer 3 of the main body 1.

A receiving member 9 is arranged in the recess 5 and is swingably supported by the distal end portions of the hinge shafts 8 projecting inwardly from the respective side walls of the recess 5. Specifically, the receiving member 9 has an elongated box-like shape corresponding to the shape of the recess 5. The member 9 has a bottom with an arcuate cross section and opens at the top. The inner surface of the receiving member 9 defines a mounting portion 9a in which a connecting portion of the display unit 6 (as described later) is fitted. A plated layer 11 serving as an electrically conductive portion is formed on the inner surface (the whole area of the inner surface, for example) of the receiving member 9. The side walls of the receiving member 9 are swingably supported on the respective end portions of the hinge shafts 8 by means of bearings 10. In the both lateral end portions of the receiving member 9 are provided cover plates 12 so as to cover the bearings 10. The distal end of each hinge shaft 8 is provided with a plate-like engaging portion 8b (see FIG. 2) which projects into the mounting portion 9 passing through the corresponding cover plate 12.

Figure 4:
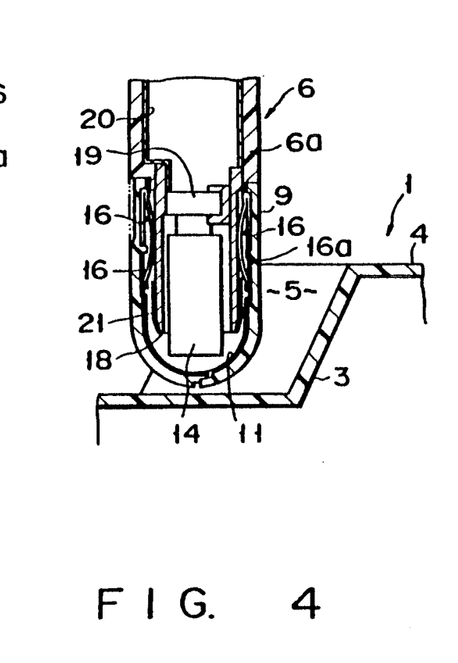
FIG. 4 is a cross-sectional view taken along line IV—IV of FIG. 3.
Figure 7:
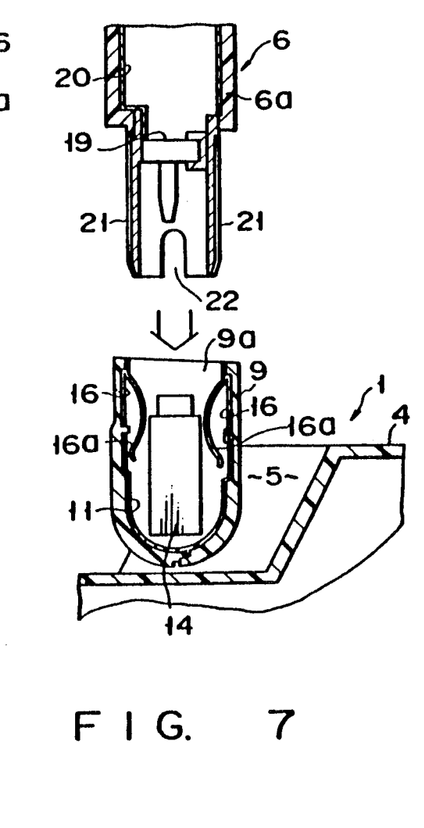
FIG. 7 is a cross-sectional view taken along line VII—VII of FIG. 6.

A connector 14 is located at the central portion in the mounting portion 9a of the receiving member 9 and is connected to the main circuit board in the main body 1 by means of a flexible wire 14a. As shown in FIGS. 4 and 7, a belt-like contact piece 16 (first conducting means) having an arcuate movable portion 16a is attached to the central part of the inner face of each of the front and rear walls of the receiving member 9 so that the movable portion 16a extends in the mounting portion 9a. Each contact piece 16 is electrically connected to the plated layer 11 of the receiving member 9.

Figure 5:
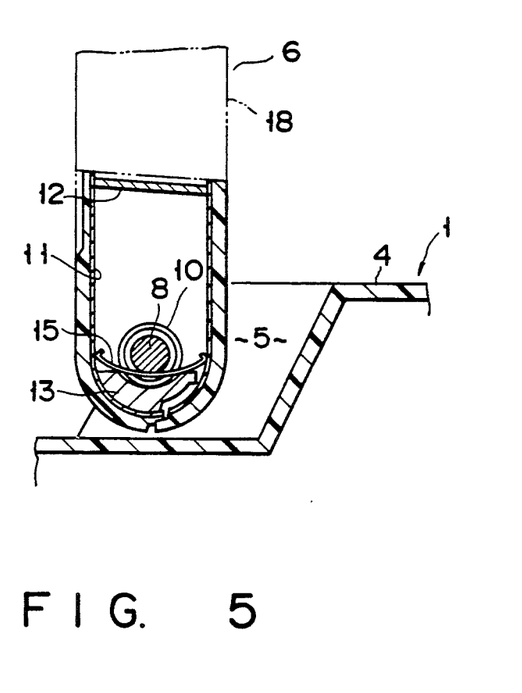
FIG. 5 is a cross-sectional view taken along line V—V of FIG. 3.

As shown in FIGS. 3 and 5, each cover plate 12 is spaced apart by a predetermined distance 6 from the corresponding side wall of the receiving member 9. An arcuated base member 13 is arranged right under the hinge shaft 8 in a space defined by each cover plate 12 and the corresponding side wall. At the least arcuate face of the base member 13, which faces the hinge shaft 8, is plated. In other words, at the least arcuate face of the base member 13 constitutes an electrically conductive portion. An elastic belt-like conductive piece 15 (second conducting means) formed of a plate spring is sandwiched between the arcuate face of the base member 13 and the hinge shaft 8 disposed thereabove. The conductive piece 15 has a length larger than the inner dimension of the receiving member 9, that is, the distance between the front and rear walls of the receiving member, and is curved at a radius of curvature larger than that of the arcuate face of the base member 13. As elastically deformed, the conductive piece 15 contacts at its central portion with the hinge shaft 8 and at its both end with the plated layer 11 of the receiving member 9. Thus, the hinge shaft 8 is electrically connected to the plated layer 11 of the receiving member 9 by means of the conductive piece 15.

The display unit 6 comprises a flat box like cover 6a, a flat panel display 17 such as a liquid crystal display housed in the cover 6a, and an electronic circuit board (not shown) for driving the flat panel display 17. The inner face (the whole area of the inner face, for example) of the cover 6a is coated with a plated layer 20 as an electrically conductive layer which constitutes a shielding portion of the display unit, for shielding the interior of the cover 6a. From the lower end of the cover 6a projects a box-like connecting portion 18 which is adapted to be fitted in the mounting portion 9a of the receiving member 9. On the central part of the connecting portion 18 is arranged an insert terminal 19 which is connected to the electronic circuit board of the display unit 6. When the connecting portion 18 is fitted in the receiving member 9, the terminal 19 is connected to the connector 14 in the main body 1. Plated layers 21a are formed on that outer surfaces of the lateral walls of the connecting portion 18 which face the corresponding contact pieces 16, and electrically connected to the plated layer 20 by means of a reinforcement frame 19a fitted in the connecting portion. A contact portion 21 formed of a depression extending in the direction of the extension of the connecting portion 18 is formed in the outer surface of each lateral wall on which the plated layer 21 is formed. When the connecting portion 18 is fitted in the mounting portion 9a of the receiving member 9, the contact portions 21 contact the movable portions 16a of the contact pieces 16, respectively. The connection between them allows the shielding portion of the display unit 6 (that is, the plated layer 20) to be grounded to the main body 1.

Notches 22 are formed in the extended ends of the connecting portion 18 and the reinforcement frame 19a. When the connecting portion 18 is fitted in the mounting portion 9a of the receiving member 9, the notches 22 engage the engaging portions 8b on the distal ends of the hinge shafts 8 projecting in the mounting portion 9a. Accordingly, only when the receiving member 9 and the display unit 6 are rotated while the connecting portion 18 is fitted in the receiving member 9, the hinge shafts 8 are rotated to perform the shaft rocking function of the hinge devices 7.

By connecting the connecting portion 18 to and disconnecting it from the receiving member 9, the display unit 6 is mounted on and removed from the main body 1. After the connecting portion 18 is fitted to the receiving member 9, they are secured to each other by screws from outside the main body 1. In FIG. 2, reference numeral 23 represents a decorative plate for covering the threaded holes which are otherwise exposed externally of the receiving member 9.

According to the computer constructed above, by fitting the connecting portion 18 of the display unit 6 in the mounting portion 9a of the receiving member 9 after the receiving member 9 is set substantially vertically, as shown in FIG. 2, the display unit 6 can be mounted on the main body 1. At the same time, the shielding portion of the display unit 6 is electrically connected to the main body 1 through the connecting portion 18, thus being grounded.

Figure 6:
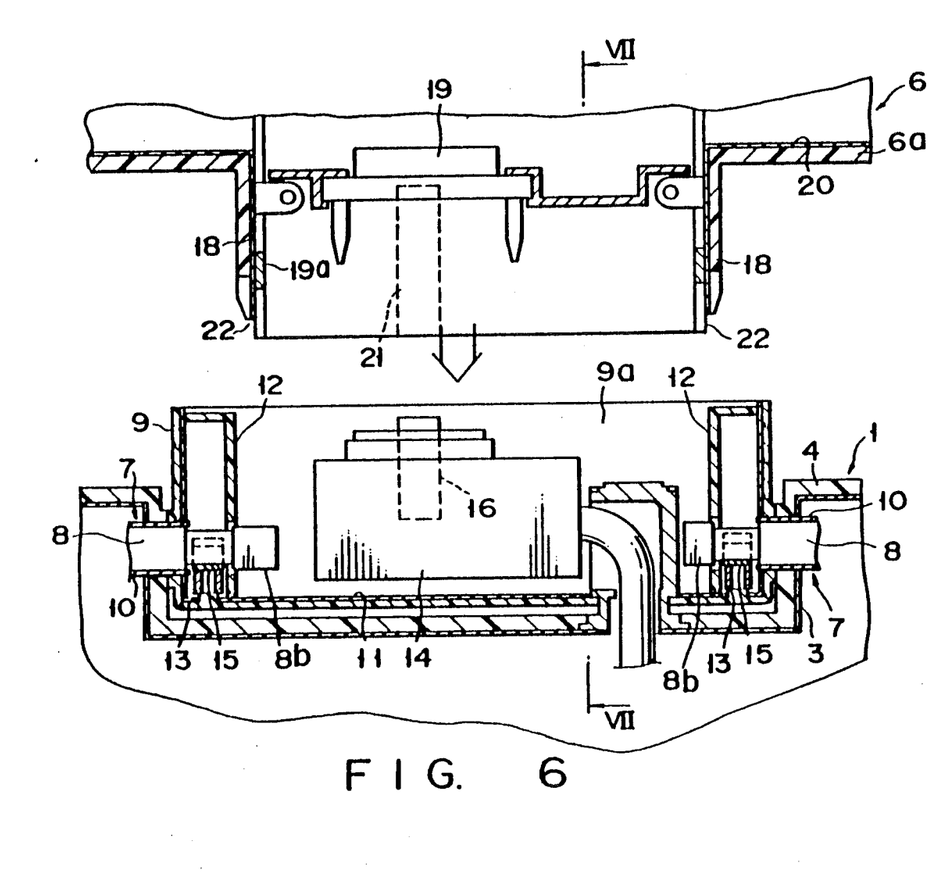
FIG. 6 is a cross-sectional view of an essential part of the computer, in which the display unit is removed.

Specifically, as shown in FIGS. 6 and 7, as the connecting portion 18 is inserted in the receiving member 9, the contact portions 21 of the connecting portion 18 slidably contact the movable portions 16a of the contact pieces 16 fixed to the receiving member 9. Further, while keeping the sliding contact between the contact portions 21 and the movable portions 16a, the insert terminal 19 in the connecting portion 18 is connected to the connector 14 in the receiving member 9, and the engaging portions 23 of the hinge shafts 8 engage the respective notches 22 formed in the lower portion of the connecting portion 18, as shown in FIGS. 3 and 4.

The hinge shaft 8 of each hinge device 7 is electrically connected to the plated layer 11 on the inner face of the receiving member 9 through the conductive piece 15. Therefore, the connecting portion 18 electrically connected to the plated layer 20 of the display unit 6 is electrically connected to the plated layer 3 of the main body 1 through the contact portions 21, the contact pieces 16, the plated layer 11 on the inner face of the receiving member 9, the conductive piece 15, and the hinge shafts 8 of the hinge units 7.

On the contrary, the display unit 6 can be removed from the main body 1 by detaching the connecting portion 18 from the receiving member 9. Thereupon, the electrical connection between the display unit 6 and the main body 1 is interrupted.

According to the personal computer constructed as described above, the electrical connection between the hinge devices 7 and the receiving member 9 is attained by the elastic conductive pieces 15 disposed therebetween. Even if, therefore, there is a substantive assembling error between the hinge devices 7 and the receiving member 9, the elastic deformation of the conductive pieces 15 ensures that these pieces are in contact with the hinge shafts 8 and the plated layer 11 of the receiving member 9, thereby electrically connecting the hinge shafts and the plated layer to each other securely. Further, the electrical connection between the connecting portion 18 and the receiving member 9, between which the display unit 6 can be separated from the main body 1, is attained by the contact pieces 16 with the movable portions 16a and the contact portions 21. In this respect, even if there is a substantive manufacturing error in the arrangement of the connecting portion 18 and the receiving member 9, the action of the movable pieces 16a ensures the electrical connection between the connecting portion 18 and the receiving member 9. These arrangements enable the computer having a removable display unit 6 to cause the shielding portion of the display unit 6 (namely, the plated layer 20) to be securely connected to the ground portion of the main body 1, with the result that the display unit 6 is fully shielded from the electromagnetic waves. It is a notable feature that the grounding operation is automatically carried out in interlock with the mounting operation of the display unit 6 on the main body 1.

In the above, the present invention is applied to a personal computer. However, the present invention is not limited thereto, but may be applied to other portable electronic apparatuses such as word processors. Further, the contact pieces 16 may be fixed to the connecting portion 18 of the display unit 6 and the contact portions 21 may be formed on the inner face of the receiving member 9.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An electronic apparatus comprising:
   a main body having a first shielding portion for electromagnetically shielding an interior of the main body, and a hinge shaft fixed to the main body and electrically connected to the first shielding portion;
   a receiving member supported by the hinge shaft to be rotatable with respect to the main body, said receiving member having an externally opened mounting portion and a first electrically conductive portion provided on an inner face of the mounting portion;
   a display unit having a connecting portion removably fitted to the mounting portion and rotatable together with the receiving member, said display unit having a second shielding portion for electromagnetically shielding an interior of the display unit, said connecting portion having a second electrically conductive portion electrically connected to the second shielding portion;
   first conducting means for electrically connecting the first conductive portion with the second conductive portion when the connecting portion is fitted to the mounting portion of the receiving member; and
   second conducting means provided between the first conductive portion and the hinge shaft, for electrically connecting the receiving member and the hinge shaft wherein the second shielding portion is electrically connected through the first and second conductive portions and the first and second conducting means to the first shielding portion.

2. An apparatus according to claim 1, wherein said second conducting means comprises a conductive piece elastically contacting both the first conductive portion and the hinge shaft.

3. An apparatus according to claim 2, wherein said receiving member has a pair of opposed lateral walls defining the mounting portion, said first conductive portion has an electrically conductive layer formed on inner surfaces of said lateral walls, said hinge shaft has a projecting portion extending in the mounting portion, and said conductive piece includes a curved plate spring having two ends contacting said inner surfaces of the lateral walls, and an intermediate portion contacting the hinge shaft.

4. An apparatus according to claim 3, wherein said second conducting means has a base member fixedly arranged in the mounting portion so as to face the hinge shaft with a predetermined space, and said conductive piece is interposed between the hinge shaft and the base member.

5. An apparatus according to claim. 4, wherein said base member has an arcuate supporting face opposed to the hinge shaft, and said conductive piece is curved at a radius of curvature larger than that of the supporting face.

6. An apparatus according to claim 3, wherein said projecting portion of the hinge shaft has an engaging portion, and said connecting portion of the display unit has an engaging portion for engaging the engaging portion of the hinge shaft and allowing the hinge shaft to rotate integrally with the display unit.

7. An apparatus according to claim 1, wherein said first conducting means includes an elastic contact piece attached to either one of said conductive portions of the connecting portion and the receiving member, and a contact portion formed on the other one of said conductive portions and contacting the elastic contact piece.

8. An apparatus according to claim, 7, wherein said receiving member has lateral walls defining said mounting portion and an electrically conductive layer formed on an inner face of each of said lateral walls and constituting said electrically conductive portion of the receiving member, and said elastic contact piece is fixed onto the electrically conductive layer of the receiving member and has an elastically deformable moving portion which projects in the mounting portion.

9. An apparatus according to claim 8, wherein said electrically conductive portion of the connecting portion has an electrically conductive layer formed on an outer surface of the connecting portion, and said contact portion has a depression formed in the outer surface of the connecting portion and elastically engaging the moving portion of the elastic contact piece.

10. An apparatus according to claim 1, wherein said display unit comprises a flat display, a cover enclosing the flat display, and an electrically conductive layer formed over a substantial area of an inner face of the cover and constituting the shielding portion of the display unit, and said connecting portion projects from the cover.

11. An apparatus according to claim 1, wherein said shielding portion of the main body has an electrically conductive layer formed over a substantial area of an inner face of the main body.

12. An electronic apparatus comprising:
a main body including a receiving member having an externally opened mounting portion and a first electrically conductive portion formed on an inner face of the mounting portion;
first shielding means for electromagnetically shielding an interior of the main body;
supporting means for rotatably supporting the receiving member on the main body, the supporting means having a hinge shaft electrically connected to the first shielding means;
display means having a connecting portion removably fitted to the mounting portion of the receiving member, the connecting portion having a second electrically conductive portion;
second shield means electrically connected to the second conductive portion, for electromagnetically shielding said display means;
first conducting means for electrically connecting the first conductive portion with the second conductive portion when the connecting portion is fitted to the mounting portion of the receiving member; and
second conducting means provided between the first conductive portion and the hinge shaft, for effecting electrical connection therebetween, wherein the second shielding means is electrically connected through the first and second conductive portions and the first and second conducting means to the first shielding means.

* * * * *

UNITED STATES PATENT AND TRADEMARK OFFICE
CERTIFICATE OF CORRECTION

PATENT NO.   : 5,138,565
DATED        : August 11, 1992
INVENTOR(S)  : Youji Satou It is certified that error appears in the above-identified patent and that said Letters Patent is hereby corrected as shown below:

Claim 8, column 7, line 20, after "claim" delete ",".

Claim 12, column 8, line 24, change "shield" to --shielding--.

Signed and Sealed this

Twenty-sixth Day of October, 1993

Attest:

BRUCE LEHMAN

*Attesting Officer*            *Commissioner of Patents and Trademarks*